United States Patent
Isakov et al.

(10) Patent No.: US 6,267,541 B1
(45) Date of Patent: Jul. 31, 2001

(54) INDEXABLE INSERT WITH A V-SHAPED CHIP BREAKER

(75) Inventors: Edmund Isakov, Greensburg, PA (US); Earl L. Griffin, Flower Mound, TX (US); James G. Hutchens, Sanford, NC (US)

(73) Assignee: Kennametal PC Inc., Monrovia, CA (US)

( * ) Notice: Subject to any disclaimer, the term of this patent is extended or adjusted under 35 U.S.C. 154(b) by 0 days.

(21) Appl. No.: 09/351,033

(22) Filed: Jul. 9, 1999

(51) Int. Cl.[7] ................................................ B23B 27/22
(52) U.S. Cl. ............................ 407/114; 407/115; 407/116
(58) Field of Search .................................. 407/114, 115, 407/116, 113, 120

(56) References Cited

U.S. PATENT DOCUMENTS

| | | | |
|---|---|---|---|
| 4,447,175 | 5/1984 | Warren | 407/114 |
| 4,880,338 | 11/1989 | Stashko | 407/114 |
| 5,044,840 | 9/1991 | Fouquer et al. | 407/114 |
| 5,122,017 | * 6/1992 | Niebauer | 407/115 X |
| 5,282,703 | 2/1994 | Itaba et al. | 407/114 |
| 5,324,144 | 6/1994 | Katbi et al. | 407/114 |
| 5,330,296 | 7/1994 | Beeghly et al. | 407/114 |
| 5,525,016 | * 6/1996 | Paya et al. | 407/116 |
| 5,695,303 | * 12/1997 | Boianjiu et al. | 407/114 |
| 5,810,520 | * 9/1998 | Hintze et al. | 407/114 |
| 5,921,722 | * 7/1999 | Paya et al. | 407/114 |

FOREIGN PATENT DOCUMENTS 4437093  4/1996 (DE).

OTHER PUBLICATIONS

International Search Report mailed Oct. 2, 2000 in counterpart International Application No. PCT/US00/16454.

* cited by examiner

*Primary Examiner*—Henry Tsai
(74) *Attorney, Agent, or Firm*—Larry R. Meenan

(57) ABSTRACT

An indexable cutting insert for use with a cutting tool includes an insert body having a first surface and a side relief surface defining a cutting edge adjacent the intersection of the first surface and the side relief surface. A chip breaking structure is interposed between the first surface and the cutting edge. The chip breaking structure includes first and second series of wedges. Each series of wedges is disposed inwardly from the cutting edge and the wedge series are disposed in orthogonal or normal relation to one another. In a preferred arrangement, the narrow edges of the first and second series of wedges are aligned with one another.

16 Claims, 2 Drawing Sheets

INDEXABLE INSERT WITH A V-SHAPED CHIP BREAKER

BACKGROUND OF THE INVENTION

1. Field of the Invention

This invention generally relates to cutting inserts, especially metal cutting inserts with chip control that effectively break thin, foil-like chips that result from cutting of a workpiece.

2. Description of Prior Art

Cutting tools typically employ a replaceable cutting insert that is securely and accurately held in place on the cutting tool. The inserts are preferably intended for indexing so that a new cutting edge can be presented for removing metal from a workpiece once the cutting edge becomes dull or worn.

During the cutting operation, the edge engages the workpiece and creates a gap between the cut portion and the remainder of the workpiece. A chip starts to flow but remains intact with the workpiece until it engages a face of the tool, typically a face of the toolholder, which imparts a curl to the chip. During a third phase of the cutting operation the ribbon, or curl, is broken into pieces to facilitate removal from the cutting region.

Thus, the cutting operation generates a ribbon-like strip of material, usually metal, removed from the workpiece. It is important to control removal of the chip material so that it does not interfere with continued cutting operations. A great deal of time, effort, and design are associated with chip handling. Although chip breaking structures are well known in the art, there is a continuous need for improvement in the area. The insert must be able to effectively embrittle and repeatedly break the thin, foil-like chips over a wide range of chip thicknesses so that the cutting tools employing such inserts can operate effectively. In addition, the chip breaking structure should be capable of use in a wide range of insert shapes and sizes. Exemplary cutting arrangements exhibiting chip control are shown and described in U.S. Pat. Nos. 5,704,737 and 5,791,833, commonly assigned to the assignee of the present invention.

SUMMARY OF THE INVENTION

The present invention is directed to an indexable cutting insert having an improved chip breaker.

An exemplary embodiment of the invention includes an insert body having a first surface and a side relief surface with a cutting edge disposed therebetween. A chip breaking structure is disposed on the first surface inwardly from the cutting edge and includes a first series of wedges disposed adjacent one another and a second series of wedges disposed adjacent one another and substantially orthogonal to the first series of wedges.

The first series of wedges have a face disposed generally parallel to the side relief surface.

Relief faces associated with the wedges of the first and second series are disposed at an angle between 40° and 900° from the wedge face. Such angles are known as wedge included angles.

A primary benefit of the invention resides in the ability to effectively break chips generated during a cutting operation into controllable pieces.

Still another benefit of the invention is found in the adaptability of the chip breaking structure to various insert configurations.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification. The invention is illustrated in the accompanying drawings which show.

DETAILED DESCRIPTION OF THE PREFERRED EMBODIMENTS

Figure 1:
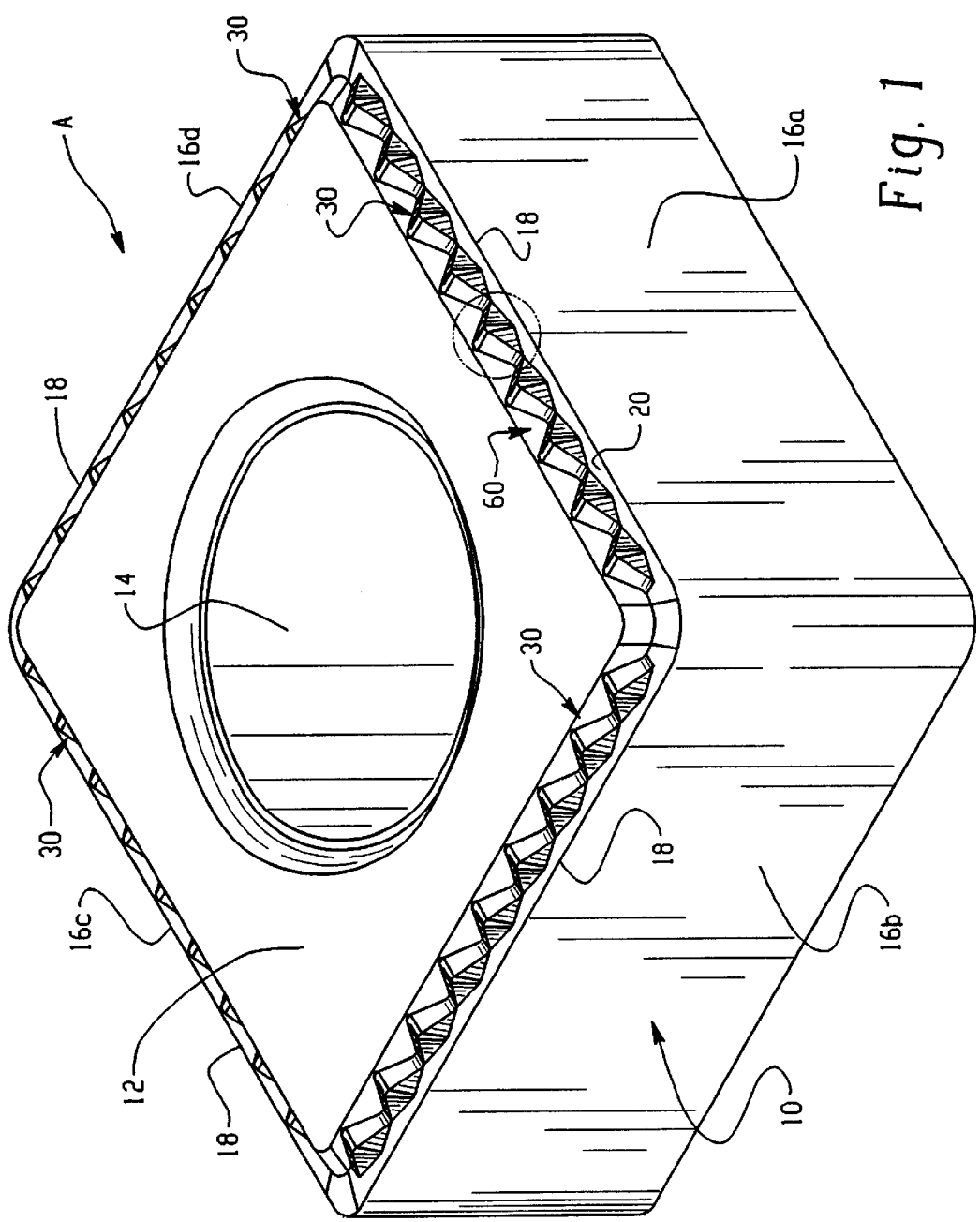
FIG. 1 is a perspective view of an indexable cutting insert formed in accordance with the subject invention.

Referring now to the drawings wherein the showings are for the purposes of illustrating the preferred embodiments of the invention only and not for purposes of limiting same, the invention shows a cutting insert A of the type that can be indexed to present alternative cutting edges to a workpiece. Although the illustrated embodiment is generally diamond-shaped, still other insert configurations can be used in accordance with the teachings of this invention. For example, inserts shaped as a square, triangle, etc. can be used and are conveniently indexed to present new cutting edges as the used cutting edge becomes worn. The inserts are typically formed from cemented carbide such as tungsten carbide, tungsten-titanium carbide, etc. The insert includes a body 10 having a first, generally planar surface 12, sometimes referred to as the "top surface." It will be appreciated, however, that since the insert can be indexed and rotated to present alternative cutting edges, that the terms "top", "bottom", and "side" are merely for ease of illustration and description. A central opening 14 is dimensioned to receive a securing element such as a fastening screw (not shown) or the like to secure the cutting insert to the tool. Of course, one skilled in the art will recognize that other securing arrangements can be used without departing from the scope and intent of the subject invention.

The body further includes side relief surfaces 16a–d, which are disposed generally orthogonal to the first surface 12. Upper terminal edges of each of the relief faces, adjacent where the plane containing the respective relief faces would intersect with the first surface 12, define cutting edges 18. As is well known, a respective cutting edge is presented by the tool holder assembly at a selected angle or orientation for a desired cutting operation.

Figure 2:
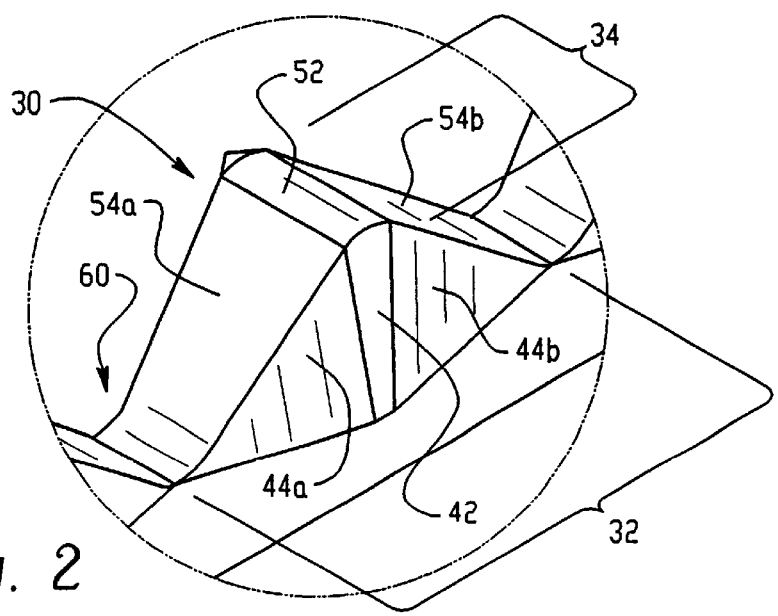
FIG. 2 is an enlarged perspective view of the chip breaking structure illustrating the first and second series of wedges.
Figure 3:
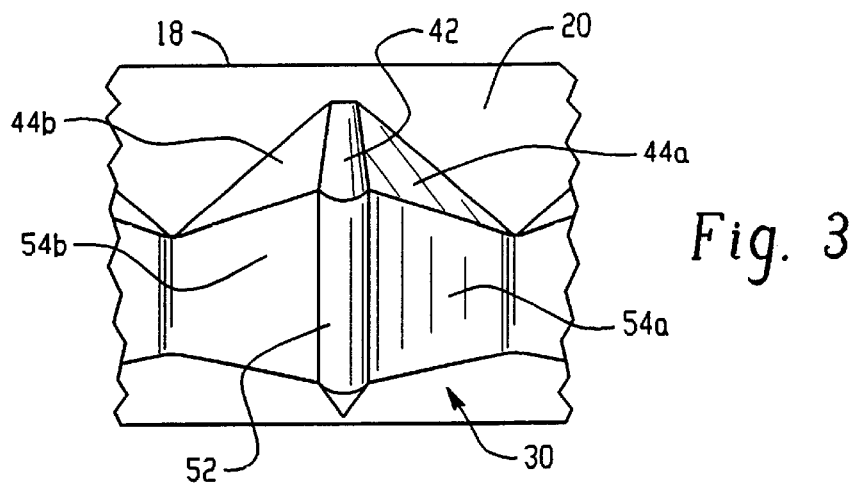
FIG. 3 is an enlarged detail view of one of the wedges.

Interposed between the first surface and the cutting edge is a peripheral land 20. The land preferably extends inwardly from the edge around the entire perimeter of the insert. The land provides a physical separation between the cutting edge and the first surface and is preferably contoured at a downward angle toward the center of the insert. Spaced inwardly from the peripheral land and toward the mounting opening 14 is the chip breaking structure 30. In the preferred arrangement the chip breaking structure includes a first series of wedges 32 (FIG. 2) disposed substantially orthogonal to a second series of wedges 34. As will be appreciated, the first series of wedges 32 are disposed in an array along the perimeter of the cutting insert. Each of the first wedges includes a narrow edge or face 42 flanked on opposite sides by relief faces 44a, 44b. As exemplified in FIG. 3, the relief faces are disposed at an angle relative to the narrow cutting edge 42 to define the preferred wedge configuration. Relief faces 44a and 44b associated with the wedges of the first series 32 may be disposed at an angle between 40° and 90° from the wedge face. (Such angles are known as wedge included angles.) The face 42 is advantageously disposed more closely adjacent the cutting edge, while the relief faces 44a, 44b extend rearwardly toward the opening 14 in the central portion of the insert.

The second series of wedges 34 are preferably aligned in peripheral fashion with the first series of wedges. That is, the narrow wedge face 52 is disposed in the same narrow, vertical plane as the first wedge face 42. The relief faces 54a, 54b extend downwardly from the second wedge face 52 and merge into valley regions 60 defined between adjacent wedges of the second series. Relief faces 54a and 54b associated with the wedges of the second series 34 may be disposed at an angle between 40° and 90° from the wedge face. (Such angles are known as wedge included angles.) More importantly, the wedge faces 42, 52 are disposed in generally orthogonal relation. This assures that chips generated from the cutting operation, and proceeding from a cutting edge toward the central portion of the insert, contact the chip breaking structure. The narrow edge of each wedge engages a chip and induces or creates a microscratch in the chip that generates a stress riser, i.e, extra stress, in the chip. This urges the chip to curl which, in turn, promotes breaking of the chip into pieces. By disposing the wedges in a pair of perpendicular planes, a higher degree of contact with the generated chip is assured.

Figure 4:
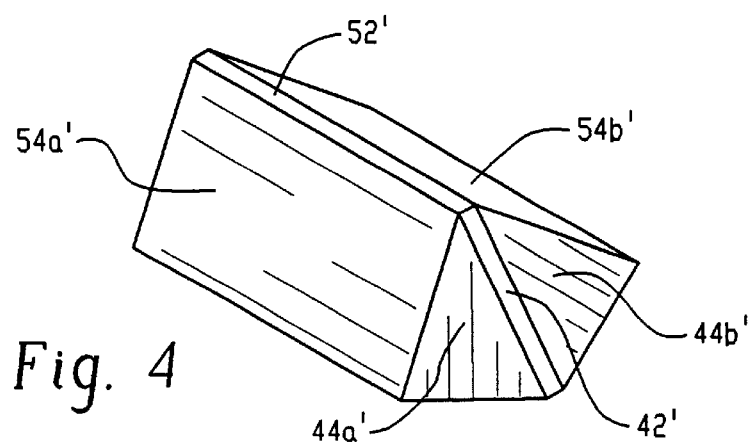
FIG. 4 is a perspective view of an alternative chip breaking configuration.

It is also contemplated that the wedges can adopt a slightly different configuration as illustrated in FIG. 4. For example, another preferred configuration defines the narrow edge of each of the wedges at the intersection of the relief faces 44a', 44b' and 54a', 54b'. Again, the narrow edges of the first and second series of wedges are preferably disposed in orthogonal or perpendicular relation and for ease of assembly are generally aligned in the same plane with one another.

It is also appreciated that just as the narrow edge 42 of the first series of wedges are disposed inwardly from the cutting edge so, too, are the narrow edges 52 of the second series of wedges disposed below the plane of the first surface. It is further appreciated, however, that depending upon the material of the workpiece, it may be preferred to have the wedge disposed higher than the first surface plateau. Thus, the horizontal wedge plane could be in the same plane, a higher plane, or a plane located below the first surface.

The invention has been described with reference to the preferred embodiments. Obviously, modifications and alterations will occur to others upon a reading and understanding of this specification. For example, the first and second series of wedges can be disposed in alternate or off-set relation relative to one another. It is intended that the present invention include all such modifications and alterations in so far as they come within the scope of the appended claims or the equivalents thereof.

What is claimed is:

1. A cutting insert for use with a cutting tool that selectively removes material from a workpiece, the cutting insert comprising:
   an insert body having a first surface and a side relief surface defining a cutting edge at an intersection of the surfaces;
   a chip breaking structure on the first surface spaced inwardly from the cutting edge, the chip breaking structure including a first series of wedges disposed contiguous one another without a gap therebetween and a second series of wedges disposed contiguous one another without a gap therebetween and substantially orthogonal to the first series of wedges.

2. The invention of claim 1 wherein the first series of wedges each include a face disposed generally orthogonal to the first surface.

3. The invention of claim 1 wherein the first series of wedges each include a face disposed generally parallel to the side relief surface.

4. The invention of claim 1 wherein the first series of wedges are substantially identical to one another.

5. The invention of claim 1 wherein the second series of wedges are substantially identical to one another.

6. The invention of claim 1 wherein the first series of wedges each include a face disposed generally orthogonal to the first surface and further include first and second relief faces angularly disposed relative to the face.

7. The invention of claim 6 wherein the included angles of the first series of wedges are between approximately 40° and 90°.

8. The invention of claim 6 wherein the included angles of the second series of wedges are between approximately 40° and 900°.

9. The invention of claim of claim 1 wherein the second series of wedges each include a face disposed generally parallel to the first surface and further include first and second relief faces angularly disposed relative to the face.

10. The invention of claim 9 wherein the included angles of the first and second series of wedges are between approximately 40° and 90°.

11. A cutting insert with chip control features comprising:
    a body having a first surface, a side relief surface extending generally orthogonal to the first surface and a cutting edge defined adjacent an intersection of the first and side relief surfaces and in a plane spaced from the first surface;
    a peripheral land on the first surface extending inwardly from the cutting edge; and
    a chip breaker interposed between the land and the first surface and including first and second series of wedges disposed contiguously without a gap therebetween, said first and second series of wedges disposed in generally orthogonal, contiguous relation to one another for control of chips generated from a cutting operation.

12. The invention of claim 11 wherein the first series of wedges each include a narrow edge oriented generally parallel to the side relief surface.

13. The invention of claim 12 wherein the first series of wedges have included angles between approximately 40° and 90°.

14. The invention of claim 11 wherein the second series of wedges each include a narrow edge oriented generally parallel to the first surface.

15. The invention of claim 14 wherein the second series of wedges have included angles between approximately 400° and 90°.

16. The invention of claim 14 wherein the narrow edges are disposed in a plane between the cutting edge and the first surface.

* * * * *